US009530325B2

(12) United States Patent
Hall

(10) Patent No.: US 9,530,325 B2
(45) Date of Patent: Dec. 27, 2016

(54) EXERCISE TRAINING SYSTEM

(71) Applicant: David Hall, Manti, UT (US)

(72) Inventor: David Hall, Manti, UT (US)

( * ) Notice: Subject to any disclaimer, the term of this patent is extended or adjusted under 35 U.S.C. 154(b) by 182 days.

(21) Appl. No.: 14/035,440

(22) Filed: Sep. 24, 2013

(65) Prior Publication Data

US 2014/0087341 A1 Mar. 27, 2014

Related U.S. Application Data

(60) Provisional application No. 61/705,032, filed on Sep. 24, 2012.

(51) Int. Cl.
  *G09B 5/02* (2006.01)
  *G09B 5/06* (2006.01)
  *G09B 15/00* (2006.01)

(52) U.S. Cl.
  CPC ............. *G09B 5/02* (2013.01); *G09B 5/065* (2013.01); *G09B 15/00* (2013.01)

(58) Field of Classification Search
  CPC .................................................. G09B 5/065
  USPC ........................................................ 434/258
  See application file for complete search history.

(56) References Cited

U.S. PATENT DOCUMENTS

| | | | |
|---|---|---|---|
| 3,865,001 A * | 2/1975 | Hershey | G10H 1/32 84/602 |
| 5,916,063 A | 6/1999 | Alessandri | |
| 6,230,047 B1 * | 5/2001 | McHugh | 600/519 |
| 6,740,007 B2 | 5/2004 | Gordon et al. | |
| 6,746,247 B2 * | 6/2004 | Barton | 434/247 |
| 7,024,677 B1 | 4/2006 | Snyder et al. | |
| 7,870,488 B2 | 1/2011 | Kirkpatrick | |
| 8,156,435 B2 | 4/2012 | Wohlert | |
| 2008/0103023 A1 | 5/2008 | Chung et al. | |
| 2009/0047644 A1 | 2/2009 | Mensah et al. | |
| 2009/0047645 A1 * | 2/2009 | Dibenedetto et al. | 434/258 |
| 2009/0098981 A1 | 4/2009 | Del Giorno | |
| 2009/0298650 A1 | 12/2009 | Kutliroff | |
| 2010/0021877 A1 * | 1/2010 | Butler | 434/322 |
| 2010/0075806 A1 * | 3/2010 | Montgomery | 482/8 |
| 2010/0112536 A1 * | 5/2010 | Claassen | A63B 24/0075 434/258 |
| 2011/0212424 A1 | 9/2011 | Smith | |
| 2013/0171599 A1 * | 7/2013 | Bleich et al. | 434/247 |

* cited by examiner

*Primary Examiner* — Robert J Utama
*Assistant Examiner* — Thomas Hong
(74) *Attorney, Agent, or Firm* — JP Webb; Jason P. Webb; Danny Y. H. Cheng

(57) ABSTRACT

An exercise training system for facilitating tempo-based exercising using a computing device. The system includes a music library module having a plurality of selectable music files stored in a data storage device. The system includes a video instruction library module including a plurality of selectable video instruction files stored in a data storage device. The system includes a builder module to manage organization of selected music files and video instruction files into a coordinated music stream and a coordinated video instruction stream using a processor. The system includes a tempo registration module for selectably altering an effective tempo of each of the music stream and the video instruction stream to each match a selectable desired tempo using a processor. The system includes a tempo selection module to permit a user to select a value for the desired tempo.

16 Claims, 8 Drawing Sheets

EXERCISE TRAINING SYSTEM

CROSS-REFERENCE TO RELATED APPLICATIONS

This invention claims priority, under 35 U.S.C. §120, to the U.S. Provisional Patent Application No. 61/705,032 to David Hall filed on Sep. 24, 2012, which is incorporated by reference herein.

BACKGROUND OF THE INVENTION

Field of the Invention

The present invention relates to exercise programs, specifically to an exercise training system.

Description of the Related Art

Physical fitness is a general concept defined in many ways. There is general fitness: a state of health and well-being, and specific fitness: a task-oriented definition based on the ability to perform specific aspects of sports or occupations. Physical fitness is generally achieved through correct nutrition, exercise, hygiene and rest.

A comprehensive fitness program tailored to an individual typically focuses on one or more specific skills, and on age, or health-related needs; also cite mental, social and emotional health as an important part of overall fitness. Physical fitness may also prevent or treat many chronic health conditions brought on by an unhealthy lifestyle or aging. To stay healthy it is important to engage in physical activity. Diet is an important component to overall health that works best in combination with exercise.

A personal trainer is a fitness professional involved in exercise prescription and instruction. They motivate clients by setting goals and providing feedback and accountability to clients. Trainers also measure their client's strengths and weaknesses with fitness assessments. These fitness assessments may also be performed before and after an exercise program to measure their client's improvements in physical fitness. They may also educate their clients in many other aspects of wellness besides exercise, including general health and nutrition guidelines. Qualified personal trainers recognize their own areas of expertise. If a trainer suspects that one of his or her clients has a medical condition that could prevent the client from safe participation in an exercise program, they must refer the client to the proper health professional for prior clearancev Fitness game, Exergaming or exer-gaming (a portmanteau of "exercise" and "gaming") is a term used for video games that are also a form of exercise. Exergaming relies on technology that tracks body movement or reaction. The genre has been credited with upending the stereotype of gaming as a sedentary activity, and promoting an active lifestyle. However, research indicates that exergames do not actually promote a more active lifestyle. Exergames are seen as evolving from technology changes aimed at making video games more fun Some improvements have been made in the field. Examples of references related to the present invention are described below in their own words, and the supporting teachings of each reference are incorporated by reference herein:

U.S. Pat. No. 8,156,435, issued to Wohlert, discloses systems and methods to select media content are provided. A particular method includes generating a media playlist based on user preference data and generating a user interface display. The user preference data indicates proportions of each of a plurality of categories of media content to be present in the media playlist. The user interface display presents the user preference data using adjustable bars. Each bar is associated with one of the categories of media content, and a dimension of each bar is associated with the proportion of the respective category of media content included in the media playlist. The method includes receiving user input adjusting the dimension of a first bar associated with a first category of the plurality of categories of media content. The method includes adjusting the proportion of the first category of media content included in the media playlist based on the user input.

U.S. Pat. No. 7,870,488, issued to Kirkpatrick, discloses an audio and video editing system is disclosed. The editing system uses a displayable object document that comprises: (i) a verbal transcript of an audio recording (e.g., a stored version of a recorded interview, etc.), and (ii) one or more hyperlinks into one or more video recordings, where each video recording is a stored version of a video recording (e.g., of a participant in a interview, etc.). Each hyperlink in the object document associates a portion of the stored video recording with a hyperlink caption in the object document. Each time code that appears in the object document is a hyperlink caption that points to a different portion of the video recording. A user can access a desired portion of the video recording by selecting the associated hyperlink caption in the object document.

U.S. Pat. No. 7,024,677, issued to Snyder et al., discloses an integrated, fully automated video production system provides a video director with total control over all of the video production devices used to produce and broadcast a show. Such devices include, but are not limited to, cameras, robotic pan/tilt heads, video tape players and recorders (VTRs), video servers and virtual recorders, character generators, still stores, digital video disk players (DVDs), audio mixers, digital video effects (DVE), video switchers, and teleprompting systems. The video production system provides an automation capability that allows the video director to pre-produce a show, review the show in advance of "air time," and then, with a touch of a button, produce the live show. In one embodiment, the invention provides a video production system having a processing unit in communication with one or more of the video production devices. The processing unit also records the show or elements from the show following its production. The show or elements can be recalled for subsequent broadcasts. An Internet interface supports live or on-demand requests for content from the video production. In an embodiment, an online user selects specific. elements and reorganizes the elements to personalize a broadcast. The processing unit receives and executes the online request to continuously stream or download the content to the user. In an embodiment, various supporting features enhance and extend the content of the video production, such as real time polling, hyperlinks to related web sites, video captions, and the like.

U.S. Patent Application Publication No.: 2008/0103023, by Chung et al., discloses a method for selecting and modifying particular exercise videos from a stored database into a customized digital-format exercise regime viewable by an individual.

U.S. Patent Application Publication No.: 2009/0047644, by Mensah et al., discloses a multimedia system product for use in physical fitness training including a method and system for producing customized physical fitness programs through an internet-based environment. The user is allowed to select the individual components of the exercise video and manipulate motion capture data by using a graphics engine to customize the "look and feel" of the customized workout through available training avatars. The individual components eligible for inclusion are included in a database containing a plurality of audio and visual media files of personal trainers performing exemplar exercises. The compiled instructional video is then available for download and installation on a video-enabled personal media player.

The inventions heretofore known suffer from a number of disadvantages which include but not limited to failing to: be easier to use, be personalized, be a more immersive exercise experience, allow the creation of customized exercise program, allow for an evolving program of exercise, create better health, promote health and wellness at a deeper level, be more satisfying for the user, allow creation of a holistic and consistent experience, adapt appropriately for exercise types wherein a user cannot easily change the tempo at which they exercise, adapt appropriately for exercise wherein a user is required or otherwise desires to exercise at a specific tempo, adapt to the wants and needs of the user, increase motivation of the user, and better adapt to the body movements of the user, and the like and other disadvantages that one of ordinary skill in the art would recognize upon reading this disclosure.

What is needed is an exercise training system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available exercise training systems. Accordingly, the present invention has been developed to provide a personal exercise training system specific for each user.

According to one embodiment of the invention, there is an exercise training system for facilitating tempo-based exercising using a computing device. The system includes a music library module that may include a plurality of selectable music files stored in a data storage device. The system may include a video instruction library module that may include a plurality of selectable video instruction files stored in a data storage device. The system may include a builder module in communication with each of the music library and the video instruction library module and may manage organization of selected music files and video instruction files into a coordinated music stream and a coordinated video instruction stream using a processor. The system may include a tempo registration module that may selectably alter an effective tempo of each of the music stream and the video instruction stream to each match a selectable desired tempo using a processor. The system may include a tempo selection module in communication with the tempo registration module that may permit a user to select a value for the desired tempo.

The exercise training system may include a management module in communication with the builder module that may authorize and manage a plurality of users of the system. The system may include a third party interaction module in communication with the builder module that may permit a third party to automatically prescribe files through the system to a particular user. The third party interaction module may include an advice module for a third party to recommend or advise a user about exercise or diet plans. The system may include a user library module that may permit users to automatically share coordinated music and video instruction streams to other users. The system may include an expert library module for expert trainers and instructors to publish coordinated music and video instruction streams to a plurality of user subscribers. The system may include a display device in communication with the processor for viewing a coordinated music stream and a coordinated video instruction stream. The system may include a tempo calculation module for automatically calculating a desired tempo based on characteristics associated with a particular user. The system may include a tempo test module for testing a desired tempo of the coordinated music and video instruction stream.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
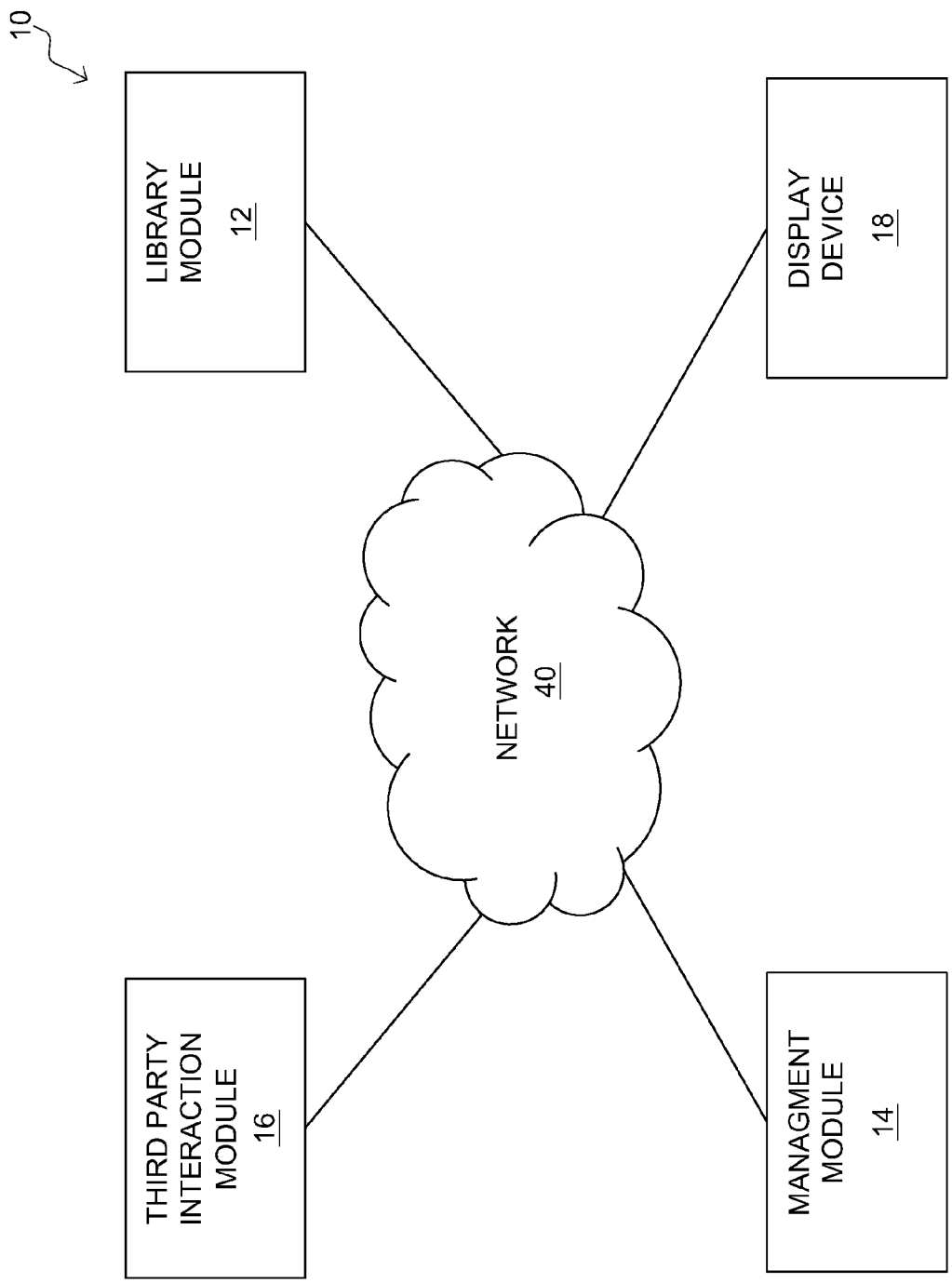
FIG. 1 is a network diagram of an exercise training system, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Andriod, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a network diagram of an exercise training system, according to one embodiment of the invention. There is shown an exercise training system 10 including a library module 12, a management module 14, a third party interaction module 16, and a display device 18, each in communication with each other over a network. Advantageously, such a system, in varying embodiments, is able to provide one or more of the benefits of: being easier to use, being personalized, being a more immersive exercise experience, allowing the creation of customized exercise program, allowing for an evolving program of exercise, creating better health, promoting health and wellness at a deeper level, being more satisfying for the user, allowing creation of a holistic and consistent experience, adapting to the wants and needs of the user, increasing motivation of the user, and better adapting to the body movements of the user, and the like and other advantages that one of ordinary skill in the art would recognize upon reading this disclosure.

The illustrated exercise training system 10 is configured to provide instructional exercise programming management over a network. The exercise training system 10 is configured to provide a customized instructional exercise program based upon interests, results, and goals of a user. The exercise training system 10 is configured to manage, edit, create, share, and store digital instructional exercise content for use as a digital instructional exercise program.

The exercise training system 10 includes a management module 14 configured to provide management operational controls to a user of the system 10. The management module 14 is configured to manage the users of the system 10. The management module 14 is configured to authorize users to create, edit, and share digital instructional exercise content over a network 40. The management module 14 is configured to authorize users and viewers of the exercise training system 10.

The exercise training system 10 includes a library module 12 configured to store instructional exercises in a digital format, such as but not limited to a digital video. The library module 12 is configured to store a plurality of instructional exercises. The library module 12 is configured to build, edit, create, and share digital instructional exercise content over a network 40. The library module 12 is configured to create a digital instructional exercise program from a plurality of instructional exercises, based upon specific attributes and interests of a user.

The exercise training system 10 includes a third party interaction module 16 configured to provide a third party, such as but not limited to a physician, to view and interact with the users of the system 10. The third party interaction module 16 is configured to provide interaction capabilities to a plurality of users of the system 10. The third party module 16 is configured to provide communication capabilities from a third party to a user and vice versa. The exercise training system 10 includes a display device 18 configured to display an instructional exercise program to the user of the system 10.

In one non-limiting example, there is a media exercise program/system/method/kit/device/apparatus/etc. that allows a user the flexibility of choosing their own activities based upon their own personal needs. Such includes the flexibility of allowing them to select/control/manage one or more of the following: different specific movements; choosing the tempo/speed of the movements and their associated display; and/or the order of the exercises. Such also includes one or more modules, such as but not limited to those described herein, that are configured to permit selection/control/management/etc. of such by the user and/or a third party for the benefit of the user.

Such selectability/etc. is particularly helpful when exercising on a trampoline because it allows flexibility for different size/weight of people realizing that trampolines do not respond at the same frequency for all people. Further, such will solve health issues for users, including but not limited to knee, back, digestion, weight, strength, movement, aerobic conditioning, and etc. In addition, it offers an integrated health approach that can be used by therapists, doctors, etc. in various industries to automatically include their recommendations in the exercise video that is generated by the system.

In one non-limiting embodiment, each exercise movement will be demonstrated through a pre-recorded video stored by the system. The pre-recorded video file includes metadata in regards to the movement and its characteristics (body part, movement name, region(s) exercised, base tempo, difficulty level, and etc.) such that the file can be sorted, queried, selected, automatically adjusted, synchronized, and/or otherwise manipulated by the system for the benefit of the user. The system is configured to permit the user to choose the activity(s) desired and drag a graphical representation of the associated media to a builder module that allows them to graphically put together the activities within a template. The system is configured to allow the user to determine each of the movements, their order, how long they want to perform the activities and the tempo of the activities.

In one non-limiting example, activity/movement files and media files can be associated together (automatically or otherwise) and when that is done the tempo of the combined media is automatically synchronized and set to a single frequency. The set frequency/tempo may automatically match a music tempo of a media file, a base tempo of a movement/activity file, a user tempo associated with a user account, or some other tempo that may be calculated based on the other described tempos or may be derived from another source, such as but not limited to as setting selected by a third party. A tempo may be a specific fixed tempo, a tempo schedule, a formula for altering a tempo over time, and/or combinations thereof. A non-limiting example is associating a music media file with an exercise video file and then adjusting one or the other to match the tempo of the other. The template may have auto-adjusting times/tempos over time or over different exercise sessions.

Through combined and/or associated media files the system is configured to permit the user to create their own experience which will give them control over their exercising environment. Other media files can be selected and associated with the template, such as but not limited to background music, interface skin, celebrity coach (virtual or otherwise), group videos, and etc. These files may also have metadata or other data associated with them that facilitates in customizing, searching, sorting, synchronizing and/or otherwise automatically utilizing such files in the system as described and/or to provide one or more of the described benefits herein. The system may be configured to assign different programs/experiences to particular days or on a schedule. The system may mix and match avatars, icons, etc. (which may be modeled after specific models, athletes, cartoon characters, branded items, brands, and etc.). The movements can be analog video or digital (3-d animations). The system may automate the upload of user videos (and/or other media files) into a library by providing one or more upload wizard tools, systems, scripts, options and the like and combinations thereof and/or may allow the user the ability to publish their videos to the system for use by others. There may be a tracking system to track use, compliance, results, details about user issues/activities/etc. There may be one or more sensors and/or sensor types (weight/pressure sensors, blood pressure sensors, pulse sensors, etc.) that detect characteristics of the user, the use, the operation, and/or may be coupled to an exercise device, such as but not limited to a trampoline, the balance bar thereof, springs thereof, feet thereof, or the like or combinations thereof. Information from usage, and or from sensors may be tracked/monitored/analyzed/reported by/to the system. There may be recorded/tracked goals associated with these and compliance/fulfillment of the goals may be automatically tracked/managed/prompted/etc. by the system. There may be rewards/awards/etc. that can be media displays, announcements, incentives, achievements, and etc. that may be provided/tracked/managed/unlocked/delivered by the system and such may be associated with performance including but not limited to performance associated with tracked goals. One or more of the modules described herein may be utilized to perform the functions/structure/benefits/features/etc. described in the above mentioned example(s)/embodiment(s).

In one non-limiting embodiment, there is a system/method/apparatus/device/kit that automatically and/or selectively adjusts media tempo of display/play of one or more media files to match other media files and/or tempo setting associated with one or more settings or media files and/or to match an exercise tempo of a user, which may be calculated based on user information that may be entered and/or sensed. As a non-limiting example, a user may step onto a trampoline, which may detect a weight of a user or a displacement of a set of springs and may calculate an exercise tempo based thereon in association with known operating parameters of a trampoline and selected media files may be automatically adjusted to match an expected exercise tempo of the user. One or more of the modules described herein may be utilized to perform the functions/structure/benefits/features/etc. described in the above mentioned example(s)/embodiment(s).

In one non-limiting example, there is a system/method/apparatus/device/kit that facilitates uploading and publishing of media files by a user base and that automatically sets and/or requires user data entry associated with media file metadata such as but not limited to characteristic(s) of a media file including but not limited to tempo, movement type, body region exercised, and the like and combinations thereof. One or more of the modules described herein may be utilized to perform the functions/structure/benefits/features/etc. described in the above mentioned example(s)/embodiment(s).

In one non-limiting example, there is a system/method/apparatus/device/kit that permits, accepts, receives, stores, records, solicits, processes, analyzes, acts based upon and/or otherwise manages user provided information (feedback, data entry, parameter guesses, etc.) for an exercise system and/or that automatically reviews user provided information for accuracy and/or automatically corrects inaccurate user provided information and/or uses user provided information in the operation of the exercise system. As a non-limiting example, there may be an exercise system that allows users to upload media files and declare a base tempo rate for such files. Such a system may use sound processing to determine a likely base tempo rate and may flag a media file for review if a user entered base tempo rate differs substantially from a base tempo rate determined by a sound processing module. As another non-limiting example, multiple users may upload and characterize the same media file and differences in declared characteristics may be flagged/averaged/etc. and further system processing automatic or otherwise may be used to arrive at a more correct characteristic being recorded in association with the media file. One or more of the modules described herein may be utilized to perform the functions/structure/benefits/features/etc. described in the above mentioned example(s)/embodiment(s).

In one non-limiting example, there is a remote control module functionally coupled to a media player and/or display module of the system that includes instructions for receiving input instructions from a user and converting those input instructions to playback modification instructions for the media player and/or display module. Such a remote control module may be embodied in a handle of an exercise device, in a smartphone, through a remote control device of a smart television, on a wrist mounted electronic device, and/or etc. Such a module may be in communication with one or more other modules described herein over a network or otherwise connected thereto. Such a remote control module could be used, for example, to modify a play tempo of an already created exercise video.

According to one embodiment of the invention, there is an exercise training system 10 for facilitating tempo-based exercising using a computing device. The system 10 includes library module 12 having a plurality of selectable music files stored in a data storage device. The library module 12 includes a plurality of selectable video instruction files stored in a data storage device. The library module 12 manages organization of selected music files and video instruction files into a coordinated music stream and a coordinated video instruction stream using a processor.

Figure 2:
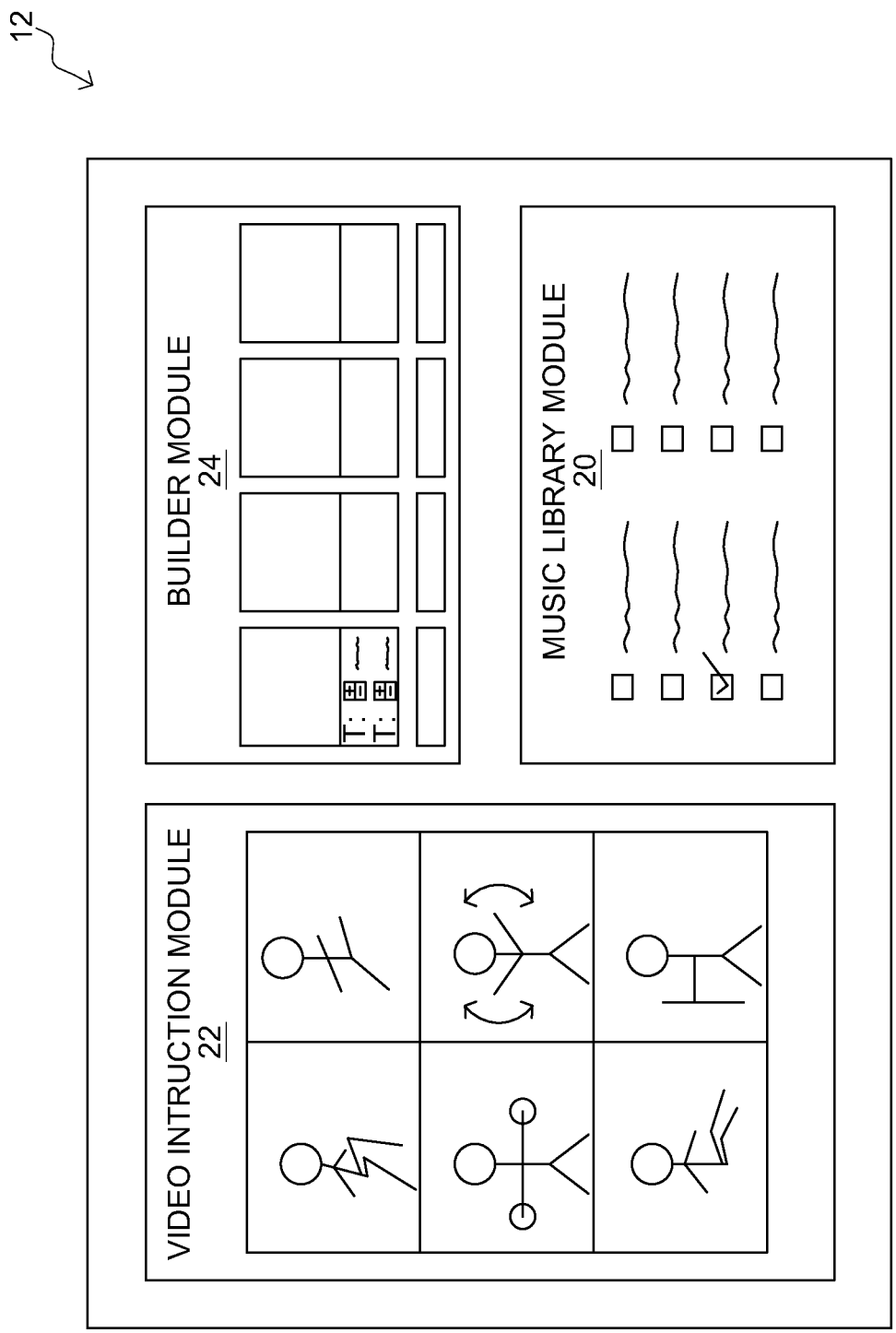
FIG. 2 is a prophetic example of a user interface of a library module of an exercise training system, according to one embodiment of the invention.

FIG. 2 is a prophetic example of a user interface of a library module of an exercise training system, according to one embodiment of the invention. There is shown a library module 12 including a video instruction module 22, a builder module 24, and a music library module 20.

The illustrated library module 12 is configured to edit, create, store, and share digital instructional exercise content over a network. The library module 12 is configured to create a digital instructional exercise program from a plurality of instructional exercises, based upon specific attributes and interests of a user. The library module 12 includes a video instruction module 22 configured to store and display for a user to select from a plurality of digital instructional exercises. The video instruction module 22 is configured to organize the plurality of instructional exercises into groups, categories, skill sets, muscle groups, type of exercise group, type of results wanted, etc. and to provide the same to the user during a build process and permit use thereof by the builder in the building of a specific media content.

The library module 12 includes a music library module 20 in communication with the video instruction module 22 and to display for selectable use by the user a library of music files available for use in building specific media content. The music library module 20 is configured to store a plurality of musical content for use in combination with a plurality of instructional exercises. The music library module 20 may be synchronized with a music library of a particular user on a digital device, such as but not limited to a MP3 player, an Ipod, a laptop, or a desktop computer, or any type of digital media player so that a user may have access to music files that they personally own. The music library module 20 is configured provide a plurality of musical content in sequence with a plurality of instructional exercises.

The library module 12 includes a builder module 24 in communication with the video instruction module 22 and a music library module 20. The builder module 24 is configured to edit, sync, compose, create, and share a digital instructional exercise program. The builder module 24 is configured to create an instructional exercise program from a plurality of digital instructional exercises from the video instruction module 22. The builder module 24 is configured to edit and piece together the plurality of digital instructional exercises into an instructional exercise program. The builder module 24 is configured to edit and manage the pace and the time intervals of each instructional exercise. The builder module 24 is also configured to sync musical content from the music library module 20, into the instructional exercise program, thereby creating a customized instructional exercise program for a specific user. The illustrated builder module interface 24 is a drag and drop interface that allows the user to select media files from other portions of the interface and drag and drop them into the illustrated boxes, thereby building a sequential media package including video and audio for use with exercising. In particular, the user may drag and drop icons associated with particular exercises and icons associated with particular music files, define durations/repetitions/start-stop times/etc. and the builder automatically associates the files accordingly. The builder may create a new single integrated media file with the associated data or may merely build a script that reaches out appropriately to the associated media files, calling/executing them at appropriate times and manners according to the instructions from the user through the illustrated interface.

In one non-limiting example, a library module 12 includes a library of affirmation/confirmation/aspiration media files that may be tagged/sorted/organized by subject matter, purpose, category, media type, length, and/or etc. and may be selectable, accessible to, and/or otherwise usable by other modules described herein, specifically including the video creator module.

Media files described herein may include video, audio, text, and/or other media types and/or may include more than one media type, such as but not limited to providing text on-screen associated with movements illustrated on a video, affirmations presented audibly, and/or etc.

Figure 3:
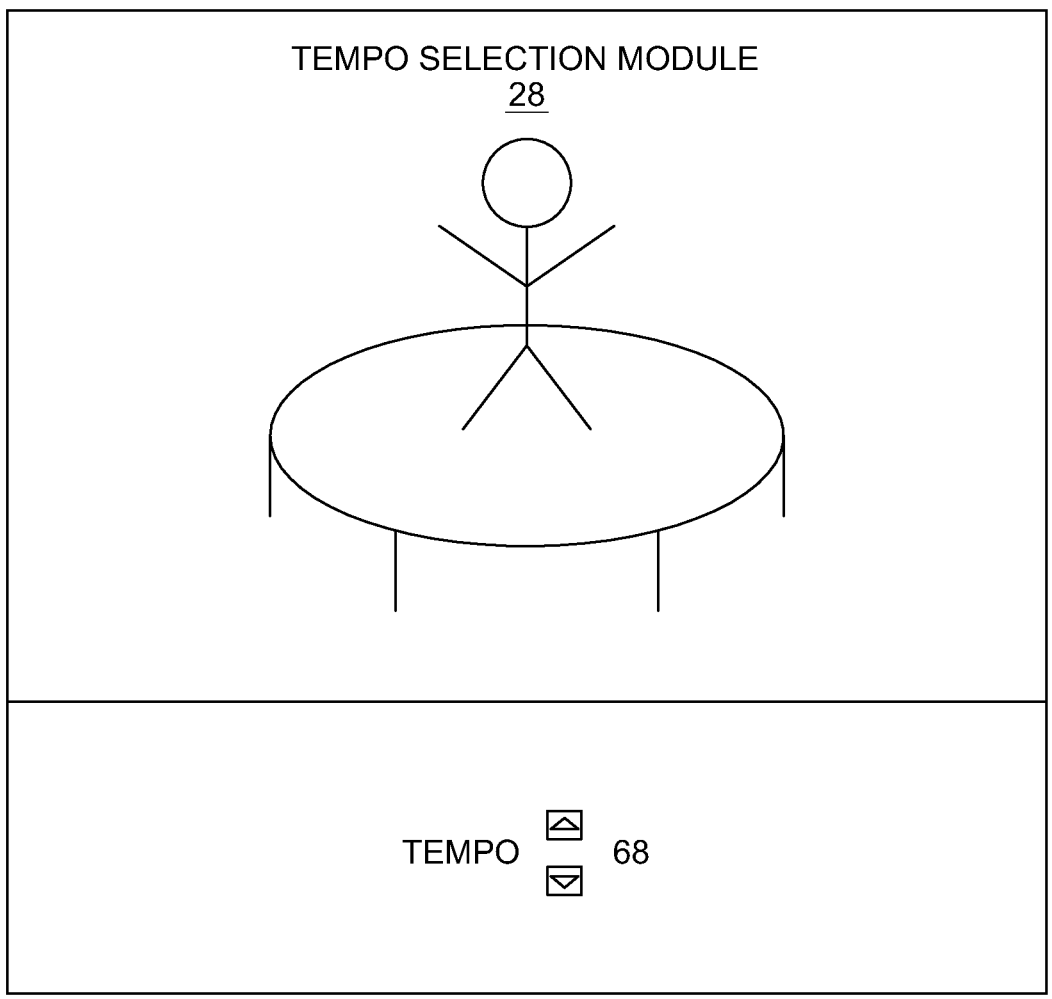
FIG. 3 is prophetic example of a user interface of a tempo selection module of an exercise training system, according to one embodiment of the invention.

FIG. 3 is prophetic example of a user interface of a tempo selection module of an exercise training system, according to one embodiment of the invention. There is shown a tempo selection module 28 in use.

The tempo selection module 28 is in communication with a tempo registration module configured to permit a user to select a value for the desired tempo. In particular, the tempo module 28 may be present during the building process and/or during the actual use of the built program. The tempo module displays an interface (e.g. the up and down arrow buttons illustrated alongside the "68" representing a particular and specific tempo) wherein the user may, through the interface, modify the actual tempo of the built program. The illustrated tempo module shows the actual current tempo and also provides buttons and/or other user interface tools (dials, scroll bars, text field entry boxes, etc.) wherein the user may change and/or determine a tempo other than that already displayed.

Figure 4:
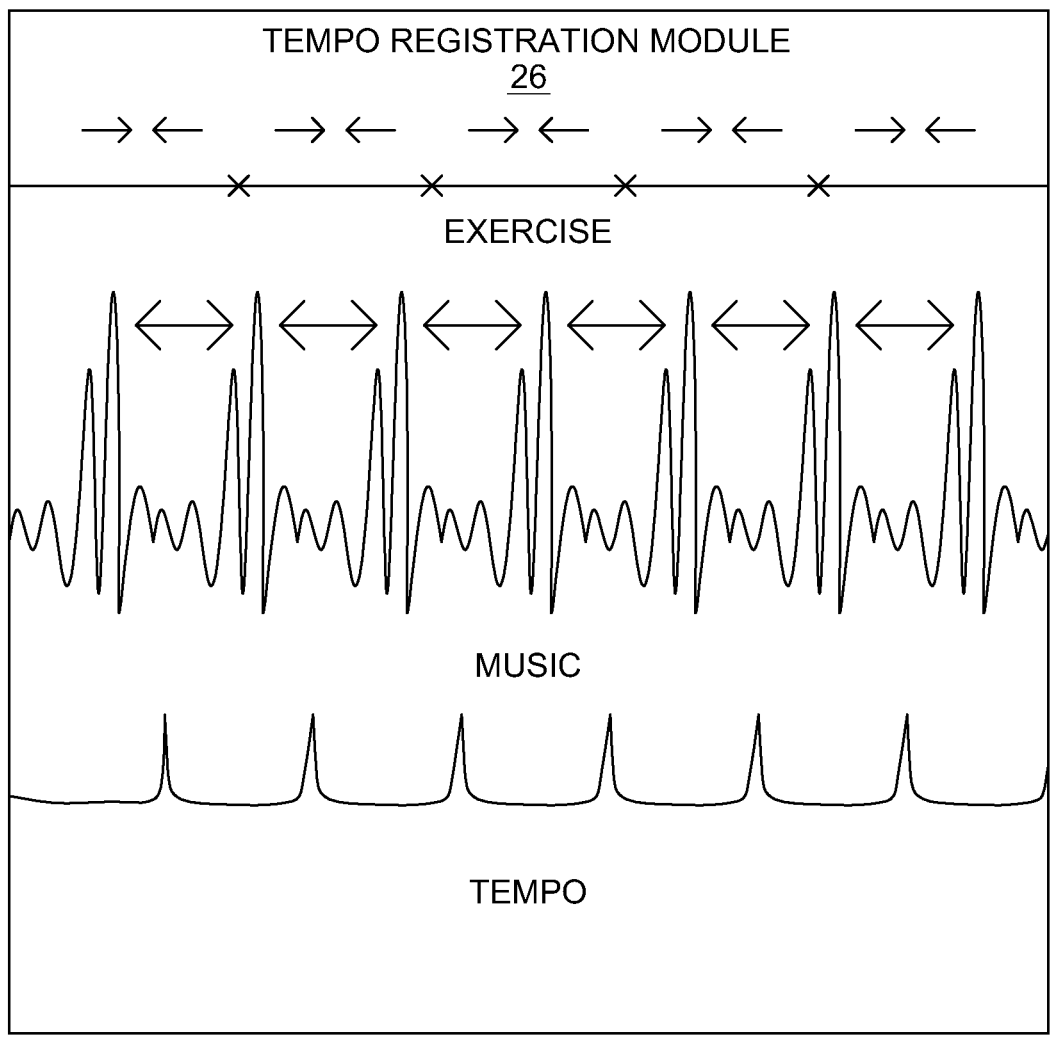
FIG. 4 is a prophetic example of operation of a tempo registration module of an exercise training system, according to one embodiment of the invention.

FIG. 4 is a prophetic example of operation of a tempo registration module of an exercise modification module of an exercise training system, according to one embodiment of the invention. There is shown a tempo registration module 26 in use, specifically a graph of (from top to bottom) video, music and desired tempo activity across a time domain (wherein time is the x-axis of the graph).

The tempo registration module 26 is configured to selectably alter an effective tempo of each of the music stream and the video instruction stream to each match a selectable desired tempo using a processor. In the illustrated tempo registration module, a desired tempo (bottom of the illustration is mapped against a tempo of a music file and against a tempo of an exercise video. In the illustrated example, the music file has a faster tempo than the desired tempo and the video has a slower tempo. Accordingly, the system alters the tempo of the music to be slower (more distance between peaks, as illustrated by the arrows), while the exercise video tempo is increased (less distance between peaks, as illustrated by the arrows. Changing tempo of a media file may be accomplished in various manners, including but not limited to saving a shortened/lengthened version of the media file, wherein data chunks are removed/inserted at regular points spaced apart a distance in the time domain shorter than the wavelength of the tempo beat desired to be shortened. Inserted chunks may be automatically approximated mathematically (numerically by a computing device). In another non-limiting embodiment, changing a tempo of a media file may be accomplished by merely altering a playback speed metadata entry associated with the file. This may also product a frequency shift of music files, but small shifts are generally not very noticeable. There are various tempo shifting tools available in commercial audio editing software tools, including but not limited to Studio One by PreSonus Audio Electronics, Inc. of Baton Rouge, La. 70806.

Figure 5:
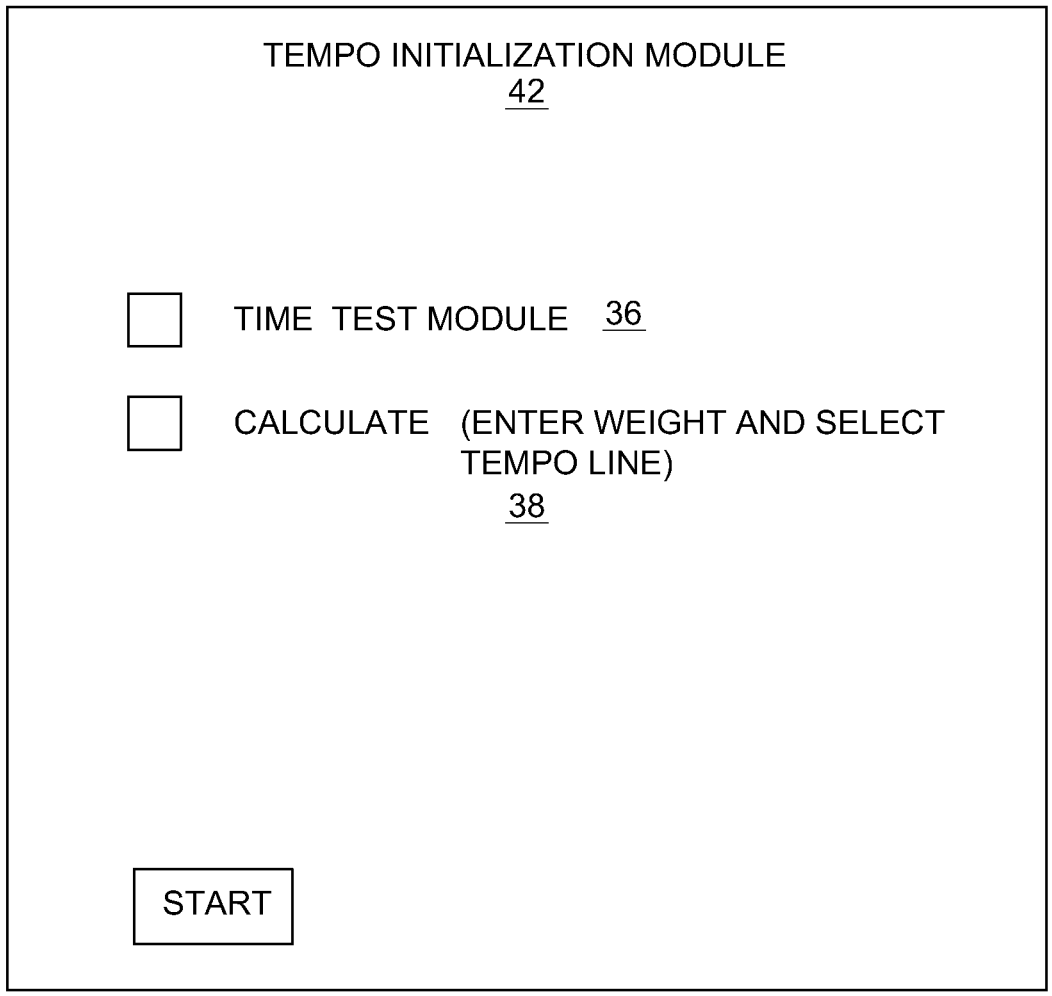
FIG. 5 is a prophetic example of a user interface of an initialization module of an exercise training system, according to one embodiment of the invention.

FIG. 5 is a prophetic example of a user interface of a tempo initialization module of an exercise training system, according to one embodiment of the invention. There is shown a tempo initialization module 42 including a tempo calculation module 38 and a tempo test module 36.

The tempo initialization module 42 is configured to include a tempo calculation module 38 for automatically calculating a desired tempo based on characteristics associated with a particular user. As a non-limiting example, the user may enter their weight and select a particular trampoline. The system may know the operational characteristics of the trampoline, which may include an effective spring constant (or curve thereof if not constant over varying weights) for the trampoline and thereby calculate an effective period of exercise for the user using the equations for simple harmonic motion or similar more complicated equations that take into effect dampening effects, variable spring constants, and the like and combinations thereof. In particular, the frequency of motion for a spring may be determined by taking the ratio of a spring constant over the mass of the user, taking the square root of that ratio and then dividing that result by two times Pi. The period may be determined by taking the inverse of the frequency. The tempo initialization module 42 may suggest a particular tempo, period or frequency as desired based on known characteristics of the user and their exercise equipment. Suggestions made by the system (herein and also throughout this specification) may be accomplished by highlighting an icon, requiring an icon be used in building media content, sending an electronic notification to a user that may include a link to the suggested file/template/routine/etc., and the like and combinations thereof. Further, the system may store information about the user, their equipment, and about alterations that the user makes in particular circumstances (such as but not limited to what tempo the user switches to when doing particular exercises). Some exercises are not just simply jumping at the natural tempo (e.g. running in place exercises). The tempo initialization module 42 includes a tempo test module 36 for testing a desired tempo of the coordinated music and video instruction stream.

Figure 6:
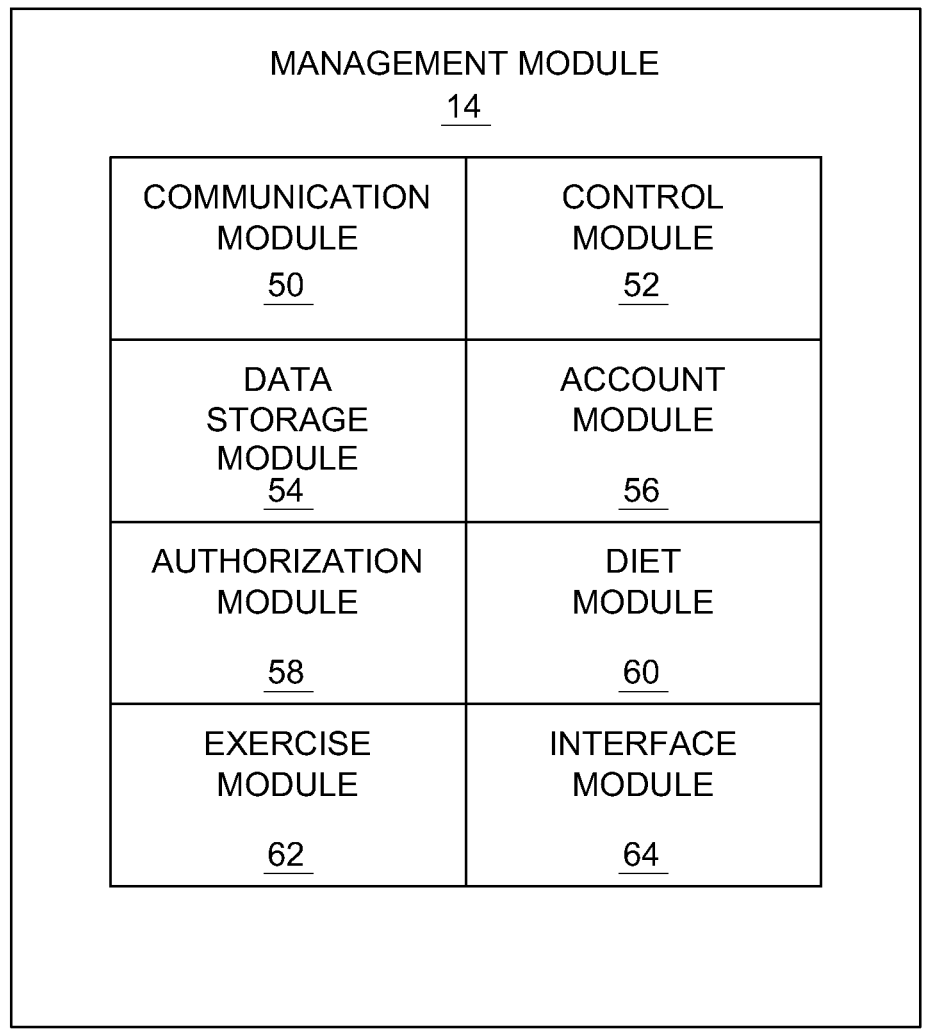
FIG. 6 a module diagram of a management module of an exercise management module, according to one embodiment of the invention.

FIG. 6 a module diagram of a management module of an exercise management module, according to one embodiment of the invention. There is shown a management module 14 including a communication module 50, a control module 52, a data storage module 54, an account module 56, an authorization module 58, a diet module 60, an interface module 64, and an exercise module 62.

The illustrated management module 14 is configured to manage users and accounts associated with an exercise training system. The management module 14 is in communication with a builder module to authorize and manage a plurality of users of the system. The management module 14 is configured to authorize and authenticate users and viewers of the exercise training system. The management module 14 is also configured to provide suggestions in regards to exercise and diet for the users of the system. The management module 14 is configured to provide guidelines, restrictions, and suggestions to the users of the system regarding a healthy balanced lifestyle.

The management module 14 includes a communication module 50 configured to provide communication capabilities to the modules and components of the management module 14. Such communication may be wireless, especially in regards to communications outside a display device, and/or may be wired and/or over a bus, such as may generally be found within the display device itself. The communication module 50 is configured to provide a secure method of communication over a network. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al. which are incorporated for their supporting teachings herein.

The management module 14 includes a control module 52 configured to provide operational controls and instructions to the modules and components of the management module 14. The control module 52 is in communication with the modules and components of the management module 14 is configured to provide operational instructions and commands thereto. Non-limiting examples of a control module may be a control module described in U.S. Pat. No. 5,430,836, issued to Wolf et al.; or a control module described in U.S. Pat. No. 6,243,635, issued to Swan et al. which are incorporated for their supporting teachings herein. A control module may include but is not limited to a processor, a state machine, a script, a decision tree, and the like.

The management module 14 includes a data storage module 54 in communication with the various modules and components of the management module 14 and configured to store data transferred therethrough. The data storage module 54 is configured to securely store user account data along with authentication and authorization codes to access the management module 14. The data storage module 54 is configured to store data from the management module 14, including data from the users of the system, data from third party viewers of the system, and data from the administrators of the system. Data storage modules may be databases or data files, and the memory storage device may be hard drives or tapes. A non-limiting example of a data base is Filemaker Pro 11, manufactured by Filemaker Inc., 5261 Patrick Henry Dr., Santa Clara, Calif., 95054. Non-limiting examples of a storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The management module 14 includes an interface module 64 in communication with the modules and components of the management module 14 and configured to provide navigational and interface capabilities to a user or administrator thereof. The interface module 64 may be a touchscreen of a personal digital assistant configured to navigate the modules of the management module 14, or a keyboard of a computing device. Non-limiting examples of an interface module may be a display/interface module as described in U.S. Pat. No. 6,272,562, issued to Scott et al.; a touch screen interface module as described in U.S. Pat. No. 5,884,202 and U.S. Pat. No. 6,094,609, issued to Arjomand, which are incorporated for their supporting teachings herein.

The management module 14 includes an account module 56 configured to manage a plurality of user accounts of the exercise training system. The account module 56 is configured to store and update user profile data such as, but not limited to: age, height, gender, weight, health conditions, physician reports, body fat percentage, cholesterol level, credentials, certifications, etc. The account module 56 is configured to store and reference data associated with a specific user of the exercise training system. Non-limiting examples of an account module may be an account creation module as described in U.S. Patent Publication No.: 2008/0281617, by Conrad et al.; or an account management system as described in U.S. Patent Publication No.: 2003/0028790, by Bleumer et all which are incorporated for their supporting teachings herein.

The management module 14 includes an authorization module 58 configured to authorize authenticate access to the modules and components of the management module 14 and the exercise training system. The authorization module 5 is configured to verify data from a user, a third party, or a viewer of the exercise training system before allowing access and linking capabilities to the users of the exercise training system. Non-limiting examples of an authorization module may be an authorization module as described in U.S. Pat. No. 7,853,993, issued to Vayman; or an authorization module as described in U.S. Pat. No. 7,753,265, issued to Harris, which are incorporated for their supporting teachings herein.

The management module 1 includes an exercise module 62 configured to store a plurality of exercises, their use, how to use, what muscle groups are used, and any other explanation or definition of each exercise. The exercise module 62 is configured to provide suggestions or preset exercises for certain muscle groups, for certain users training for specific results, for certain age groups, for certain types of user profiles, health conditions, physical limitations, etc. Non-limiting examples of an exercise module may be an apparatus as described in U.S. Patent Publication No.: 2008/0103024, by Habing; or a device as described in U.S. Patent Publication No.: 2011/0246509, by Migita et al., which are incorporated for their supporting teachings herein.

The management module 14 includes a diet module 60 configured to store a plurality of diets, their benefits, portion amounts, and any other explanation or definition of each diet and their food intake restrictions, limitations, or parameters. The diet module 60 is configured to provide suggestions or preset dietary recommendations for each user depending upon their user profile data and the results wanted by each user. The diet module 60 is configured to provide daily suggestions including personalized meal planning for each user for each day to attain a particular desired result. Non-limiting examples of a diet module may be an apparatus as described in U.S. Patent Publication No.: 2012/0096405, by Seo; or a system as described in U.S. Patent Publication No.: 2008/0235232, by Moses et al., which are incorporated for their supporting teachings herein.

Figure 7:
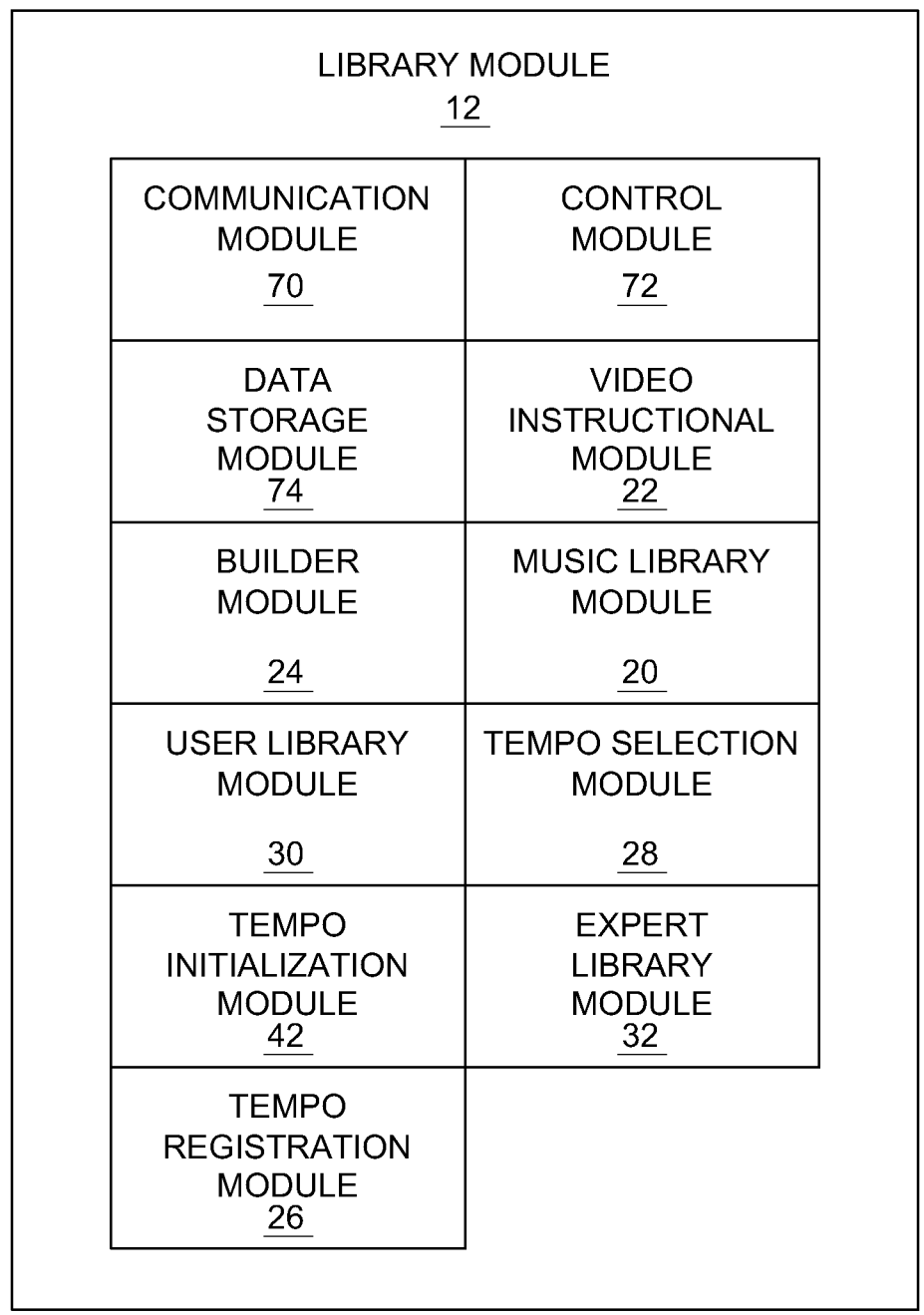
FIG. 7 is a module diagram of a library module of an exercise management module, according to one embodiment of the invention.

FIG. 7 is a module diagram of a library module of an exercise training system, according to one embodiment of the invention. There is shown a library module 12 including a communication module 70, a control module 72, a data storage module 74, a video instruction module 22, a builder module 24, a music library module 20, a user library module 30, an expert library module 32, a tempo registration module 26, a tempo selection module 28, and a tempo initialization module 42.

The illustrated library module 12 is configured to edit, create, store, and share digital instructional exercise content over a network. The library module 12 is configured to create a digital instructional exercise program from a plurality of instructional exercises, based upon specific attributes and interests of a user.

The library module 12 includes a communication module 70 configured to provide communication capabilities to the modules and components of the library module 12. Such communication may be wireless, especially in regards to communications outside a display device, and/or may be wired and/or over a bus, such as may generally be found within the display device itself. The communication module is configured to provide a secure method of communication with a plurality of users over a network. The communication module is configured to upload exercise content created by a user to a centralized server over a network.

The library module 12 includes a control module 72 configured to provide operational controls and instructions to the modules and components of the library module 12. The control module 72 is in communication with the modules and components of the library module 12 and is configured to provide operational instructions and commands thereto. The control module 72 is in communication with a management module, wherein the management module sets parameters and settings for each library module of each user based upon user profile data.

The library module 12 includes a data storage module 74 in communication with the various modules and components of the library module 12 and is configured to store data transferred therethrough. The data storage module is configured to securely store exercise, music, and/or diet data for each user of the library module 12.

The library module 12 includes a video instruction module 22 configured to store a plurality of digital instructional exercises. The video instruction module 22 is configured to organize the plurality of instructional exercises into groups, categories, skill sets, muscle groups, type of exercise group, type of results wanted, etc. The video instruction module 22 is configured to store a plurality of preset digital instructional exercise program templates for users to create a custom digital instructional exercise program. Non-limiting examples of a video instruction module may be a system as described in U.S. Patent Publication No.: 2006/0122035, by Felix; or an exercise library as described in U.S. Patent Publication No.: 2007/0166677, by Suleiman, which are incorporated for their supporting teachings herein.

The library module 12 includes a music library module 20 in communication with the video instruction module 22. The music library module 20 is configured to store a plurality of musical content for use in combination with a plurality of instructional exercises. The music library module 20 may be configured to be in sync with a separate music library of a user on a digital device, such as but not limited to a MP3 player, an Ipod, a laptop, or a desktop computer, or any type of digital media player. The music library module 20 is configured provide a plurality of musical content in sequence with a plurality of instructional exercises. Non-limiting examples of a music library module may be a system as described in U.S. Patent Publication No.: 2009/0044687, by Sorber; or a device as described in U.S. Pat. No.

7,728,214, issued to Oliver et al., which are incorporated for their supporting teachings herein.

The library module 12 includes a builder module 24 in communication with a video instruction module 22 and a music library module 20. The builder module 24 is configured to edit, sync, compose, create, and share a digital instructional exercise programs and content. The builder module 24 is configured to create an instructional exercise program from a plurality of digital instructional exercises from the video instruction module. The builder module 24 is configured to edit and piece together the plurality of digital instructional exercises into an instructional exercise program. The builder module 24 is configured to edit and manage the pace and time intervals of each instructional exercise. The builder module 24 is also configured to sync musical content from the music library module, into the instructional exercise program, thereby creating a customized instructional exercise program for a specific user. The builder module 24 is also configured to publish or share user created custom instructional exercise programs and content over a network. Non-limiting examples of a builder module may be a system as described in U.S. Pat. No. 7,793,206, issued to Lim et al.; or a video processing system as described in U.S. Patent Publication No.: 2006/0197879, by Covell et al. 5 which are incorporated for their supporting teachings herein.

The library module 12 includes a user library module 30 and an expert library module 32 in communication with the builder module 24 and configured to store customized digital instructional exercise programs over a network. The user library module 30 is configured to store and provide access to user created instructional exercise programs over a network. The expert library module 32 is configured to store and provide access to expert created instructional exercise programs over a network. An expert needs accreditation or authentication to upload and share instructional exercise programs on the expert library module. The user library module 30 permits users to automatically share coordinated music and video instruction streams to other users. The expert library module 32 is for expert trainers and instructors to publish coordinated music and video instruction streams to a plurality of user subscribers. Non-limiting examples of a user library module and an expert library module may be a data base is Filemaker Pro 11, manufactured by Filemaker Inc., 5261 Patrick Henry Dr., Santa Clara, Calif., 95054. Non-limiting examples of a user library module or a expert library module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022, which are incorporated for their supporting teachings herein.

The library module 12 includes a tempo selection module 28. The tempo selection module in communication with a tempo registration module configured to permit a user to select a value for the desired tempo. The tempo selection module is configured to enable a user to either speed up or slow down a desired tempo of an instruction video exercise. Non-limiting examples of a tempo selection module may be a system as described in U.S. Patent Publication No.: 2007/0245375; or a system as described in U.S. Pat. No. 7,060,008, which are incorporated for their supporting teachings herein.

The library module 12 includes a tempo registration module 26. The tempo registration module 26 selectably alters an effective tempo of each of the music stream and the video instruction stream to each match a selectable desired tempo using a processor. The tempo registration module 26 is configured to enable a user to alter the tempo of a music file, along with altering a tempo of an instructional exercise video, to sync and match to a desired overall tempo. Non-limiting examples of a tempo registration module may include digital media file modification tools/modules/computing devices that automatically perform time stretching techniques against a particular desired tempo/frequency of beat, such as but not limited to phase vocoding, spectral modeling, often by performing a Fourier transform on the associated media data, altering the duration while keeping pitch a constant and then reversing the Fourier transform. Such systems may also use similar techniques to determine fundamental beat frequencies/tempos for media files having an unknown beat/tempo. Such may also be accomplished by adding/removing samples into silent gaps between notes or phrases.

The library module 12 includes a tempo initialization module 95. The tempo initialization module 95 is configured to initialize a startup for a user to select a desired tempo. The tempo initialization module 95 includes a tempo calculation module 38 for automatically calculating a desired tempo based on characteristics associated with a particular user. The tempo initialization module 95 also includes a tempo test module 36 for testing a desired tempo of the coordinated music and video instruction stream. Non-limiting examples of a tempo calculation module may be include code configured to perform simple harmonics calculations based on user input, spring constant value schedules/tables across various exercise equipment brands and models, automated spreadsheet functions, and the like and combinations thereof. Non-limiting examples of a tempo test module may include one or more sensors for determining tempo of an exercise device and/or a user interface illustrating a particular tempo, wherein a user exercises while watching the test tempo display and then indicates, through the user interface, if their tempo was faster or slower than that displayed.

Figure 8:
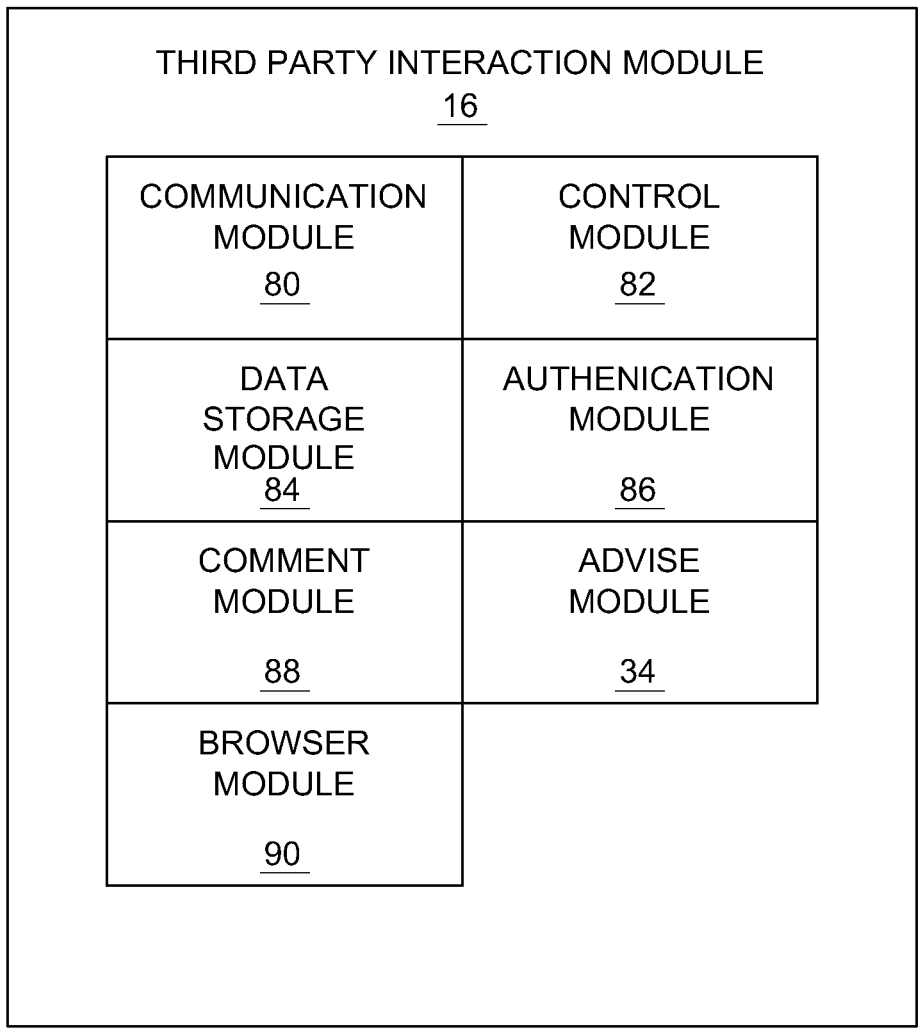
FIG. 8 is a module diagram of a third party interaction module of an exercise training system, according to one embodiment of the invention.

FIG. 8 is a module diagram of a third party interaction module of an exercise training system, according to one embodiment of the invention. There is shown a third party interaction module 16 including a communication module 80, a control module 82, a data storage module 84, an authentication module 86, a comment module 88, an advice module 34, and a browser module 90.

The illustrated third party interaction module 16 is configured to provide a third party, such as but not limited to a physician, physical trainer, peers, insurance companies, wellness officers, etc. to view and interact with the users of the exercise training system. The third party interaction module is in communication with a builder module configured to permit a third party to automatically prescribe files through the system to a particular user. The third party interaction module 16 is configured to provide interaction and communication capabilities to and from a plurality of users of the system and a plurality of third parties, such as but not limited to comments, suggestions, recommendations, prescriptions, diagnosis, remedies, compliance, usage, goal setting, achievements, etc. through texts, messages, video messages, audio messages, etc.

The third party interaction module 16 includes a communication module 80 configured to provide communication capabilities to the modules and components of the third party module 16. Such communication may be wireless, especially in regards to communications outside a physical computing device, and/or may be wired and/or over a bus, such as generally found within a computing device itself.

The communication module 80 is also configured to provide a secure method of communication and interaction with a plurality of users of the exercise training system and a plurality of third parties over a network. The system may notify the third party interaction module of activities (exercise accomplished, templates built, media files used, etc.) of users to the system that may be associated by the system with a particular third party, such as but not limited to an instructor, chiropractor or physical therapist.

The third party interaction module 16 includes a control module 82 configured to provide operational controls and instructions to the modules and components thereof. The control module 82 is in communication with the modules and components of the third party interaction module 16 and is configured to provide operational instructions and commands thereto. The control module 82 is in communication with a control module of a management module of the exercise training system and is configured to receive parameters and settings therefrom.

The third party interaction module 16 includes a data storage module 84 in communication with the various modules and components of the third party interaction module 16. The data storage module 84 is configured to store data transferred through the third party interaction module 16. The data storage module 84 is configured to securely store third party account data along with authentication and authorization codes to access the third party interaction module 16. The data storage module 84 is configured to store data from the third party interaction module 16, including but not limited to: data from the third party, data from users of the system, data from other third parties, etc.

The third party interaction module 16 includes an authentication module 86 configured to authenticate the identity of a third party. The authentication module 86 is in communication with a management module of an exercise training system over a network and is configured to authenticate and register the third party to access and interact and communicate with the users of the system. The authentication module 86 is also configured to provide a secure access to the third party interaction module every time the third party logs on to the system. Non-limiting examples of an authentication module may be a system as described in U.S. Pat. No. 8,056,122, issued to Cho et al.; or a system as described in U.S. Patent Publication No.: 2008/0077796, by Lund et al., which are incorporated for their supporting teachings herein.

The third party interaction module 16 includes a comment module 88 configured to provided interaction and communication capabilities to a third party user of the third party interaction module 16. The comment module 88 is configured to provide word messages, voice or audio messages, video messages, charts, graphs, diagrams, etc. to the third party user. The comment module 88 may be in an online chat rooms, private messages, online forums, online posts, online statuses, etc. Non-limiting examples of a comment module may be a system as described in U.S. Patent Publication No.: 2009/0318209, by Gwaltney; or a system as described in U.S. Patent Publication No.: 2004/0030697, by Cochran et al.; or a system as described in U.S. Patent Publication No.: 2011/0191406, by Plunkett et al., which are incorporated for their supporting teachings herein.

The third party interaction module 16 includes an advice module 34 configured to provide a third party user the ability to link a website, or a blog to an exercise training system. The advice module 34 is for a third party to recommend or advise a user about exercise or diet plans. The advice module 34 is in communication with a management module and is configured to provide a online webpage associated with various exercises, suggestions, remedies, recommendations, diagnosis, and advice related to a field of expertise of the third party user of the third party interaction module. The advice module 34 is monitored and regulated by an administrator of the management module of the exercise training system. Non-limiting examples of an advice module may be a linking module as described in U.S. Pat. No. 6,950,448, issued to Tornetta et al.; or a linking module as described in U.S. Patent Publication No.: 2009/0241032, by Challener et al.; or a system as described in U.S. Patent Publication No.: 2012/0197984, by Rao, which are incorporated for their supporting teachings herein.

The third party interaction module 16 includes a browser module 90 configured to provide browser capabilities to a third party user of the third party interaction module 16. The browser module 90 is configured to provide secure viewing of private data from a user of an exercise management module. The browser module 90 is configured to allow a third party user, such as a physician or physical trainer to view the progress or activity of a user, such as a patient, wherein the user authorizes browser access to the third party user. Non-limiting examples of a browser module may be a system as described in U.S. Pat. No. 7,240,193, issued to Hatfalvi et al.; or a system as described in U.S. Patent Publication No.: 2003/0113700, by Simon; or a system as described in U.S. Pat. No. 7,185,197, issued to Wrench Jr., which are incorporated for their supporting teachings herein.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

As non-limiting examples of such, an interface may be on a video screen, tablet, pc, television, smartphone, video game console, and etc. A system/method/etc. described herein may be implemented over a cloud network, may be resident on a machine, and/or may be distributed over a variety of devices. Such may be integrated with a social network system and may provide announcements, feedback, and/or collaborative usage through a network. Such may be used with exercise devices/systems/movements other than trampolines including but not limited to: treadmills, bikes, Pilates, yoga, free weight lifting, sports training, physical therapy, dance, professional training, and the like and combinations thereof and etc.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a particular style of user interface, it is understood that the style of user interfaces possible for the building and playback of media content is plethoric.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A trampoline exercise training system for facilitating tempo-based exercising, on a trampoline, using a computing device, comprising:
   a. a music library module including a plurality of selectable music files stored in a data storage device;
   b. a video instruction library module including a plurality of selectable video instruction files stored in a data storage device;
   c. a builder module in communication with each of the music library and the video instruction library module that organizes selected music files and video instruction files into a coordinated music stream and a coordinated video instruction stream using a processor;
   d. a tempo registration module that selectably alters an effective tempo of each of the music stream and the video instruction stream to match a selectable desired tempo using a processor;
   e. a tempo selection module in communication with the tempo registration module that permits a user to select a value for the desired tempo;
   f. a trampoline having a weight sensor that detects a weight a user thereof; and
   g. a tempo initialization module that receives weight information and together with operating parameters of the trampoline known to the system automatically suggests a particular tempo based on characteristics associated with a particular user and their exercise equipment; wherein both the music stream and the video instruction stream are automatically modified to the suggested tempo that is based on the weight of the user and operating parameters of the trampoline that are known within the system.

2. The system of claim 1, further comprising a third party interaction module in communication with the builder module that permits a third party to automatically prescribe files through the system to a particular user.

3. The system of claim 1, further comprising a user library module that permits users to automatically share coordinated music and video instruction streams to other users.

4. The system of claim 1, further comprising an expert library module for expert trainers and instructors to publish coordinated music and video instruction streams to a plurality of user subscribers.

5. The system of claim 2, wherein the third party interaction module includes an advice module for a third party to recommend or advise a user about exercise or diet plans.

6. The system of claim 1, further comprising a display device in communication with the processor for viewing a coordinated music stream and a coordinated video instruction stream.

7. The system of claim 1, further comprising a tempo test module for testing a desired tempo of the coordinated music and video instruction stream.

8. An exercise training system for facilitating tempo-based exercising using a computing device, comprising:
   a. a music library module including a plurality of selectable music files stored in a data storage device;
   b. a video instruction library module including a plurality of selectable video instruction files stored in a data storage device;
   c. a builder module in communication with each of the music library and the video instruction library module that organizes music files and video instruction files into a coordinated music stream and a coordinated video instruction stream using a processor;
   d. a tempo registration module that determines fundamental beat frequencies for media within the music library and selectably alters an effective tempo of each of the music stream and the video instruction stream to match a selectable desired tempo using a processor;
   e. a tempo selection module in communication with the tempo registration module that permits a user to select a value for the desired tempo;
   f. a management module in communication with the builder module that authorizes and manages a plurality of users of the system;
   g. a trampoline; and
   h. a tempo initialization module functionally coupled to the trampoline and the tempo registration module that initializes startup for a user to select a desired tempo, wherein an initial selectable desired tempo is automatically calculated by the tempo registration module based on a frequency calculation made by the system using weight information about the user and effective spring constant information about the trampoline to predict an expected bounce frequency of the user.

9. The system of claim 8, further comprising a third party interaction module in communication with the builder module that permits a third party to automatically prescribe files through the system to a particular user.

10. The system of claim 9, further comprising a user library module that permits users to automatically share coordinated music and video instruction streams to other users.

11. The system of claim 10, further comprising an expert library module for expert trainers and instructors to publish coordinated music and video instruction streams to a plurality of user subscribers.

12. The system of claim 11, wherein the third party interaction module includes an advice module for a third party to recommend or advise a user about exercise or diet plans.

13. The system of claim 12, further comprising a display device in communication with the processor for viewing a coordinated music stream and a coordinated video instruction stream.

14. The system of claim 13, further comprising a sensor coupled to the trampoline and wherein the sensor coupled to the trampoline is a sensor type selected from the group of sensors consisting of: weight sensors, pressure sensors, blood pressure sensors, and pulse sensors.

15. The system of claim 14, wherein the expert library module requires accreditation or authentication prior to allowing a user to upload and share instructional exercise programs; and wherein the third party interaction module includes a communication module, a control module, a data storage module, an authentication module, a comment module an advice module and a browser module, wherein:

the communication module provides communication capabilities to the modules of the third party interaction module;

the control module provides operational controls and instructions to the modules of the third party interaction module;

the data storage module stores data;

the authentication module that authenticates the identity of the third party user operating the third party interaction module;

the comment module provides interaction and communication capabilities to the third party user, including allowing the third party to provide word messages, voice messages, video messages, charts, graphs, and diagrams;

the advice module allows a third party user to recommend exercise or diet plans; and the browser module provides secure viewing of private data from a user.

16. A trampoline exercise training system for facilitating tempo-based exercising on a trampoline using a computing device, comprising:

a. a music library module including a plurality of selectable music files stored in a data storage device;

b. a video instruction library module including a plurality of selectable video instruction files stored in a data storage device;

c. a builder module in communication with each of the music library and the video instruction library module that organizes-music files and video instruction files into a coordinated music stream and a coordinated video instruction stream using a processor;

d. a tempo registration module that selectably alters an effective tempo of each of the music stream and the video instruction stream to match a selectable desired tempo using a processor;

e. a tempo selection module in communication with the tempo registration module that permits a user to select a value for the desired tempo;

f. a management module in communication with the builder module that authorizes and manages a plurality of users of the system;

g. a third party interaction module in communication with the builder module that permits a third party to automatically prescribe files through the system to a particular user; wherein the third party interaction module includes an advice module for a third party to recommend or advise a user about exercise or diet plans;

h. a user library module that permits users to automatically share coordinated music and video instruction streams to other users;

i. an expert library module for expert trainers and instructors to publish coordinated music and video instruction streams to a plurality of user subscribers;

j. a display device in communication with the processor for viewing a coordinated music stream and a coordinated video instruction stream;

k. a trampoline; and l. a tempo calculation module in communication with the weight sensor for automatically calculating a desired tempo based on a period of exercise calculation for a user based on the weight of the user and the effective spring constant of the trampoline.

* * * * *